United States Patent [19]

Kohn et al.

[11] Patent Number: 4,991,820
[45] Date of Patent: Feb. 12, 1991

[54] FLUID CONDUIT COUPLER

[75] Inventors: Gabriel S. Kohn, Ballwin; Robert L. Bollinger; Gregory A. Svolopoulos, both of St. Louis, all of Mo.

[73] Assignee: Allied Healthcare Products, Inc., St. Louis, Mo.

[21] Appl. No.: 477,073

[22] Filed: Feb. 9, 1990

[51] Int. Cl.⁵ .............................................. F16L 29/00
[52] U.S. Cl. .................. 251/149.5; 251/149.6
[58] Field of Search ........................ 251/149.5, 149.6

[56] References Cited

U.S. PATENT DOCUMENTS

| | | |
|---|---|---|
| 658,313 | 3/1900 | Bernardi . |
| 1,798,213 | 3/1931 | Lyman ........................ 251/149.5 |
| 2,562,294 | 11/1951 | Cahenzli, Jr. . |
| 3,430,917 | 3/1969 | Pellett ........................ 251/149.6 |
| 3,570,484 | 2/1971 | Steer et al. . |
| 3,825,222 | 6/1974 | Petrova . |
| 4,173,363 | 4/1979 | Stearns . |
| 4,186,910 | 5/1980 | Higami . |
| 4,436,125 | 2/1984 | Blenkush . |
| 4,527,587 | 7/1985 | Fairlamb ........................ 251/149.6 X |
| 4,562,856 | 1/1986 | Garvey et al. ................ 251/149.5 X |
| 4,565,211 | 1/1986 | Denney ......................... 251/149.6 X |
| 4,696,326 | 9/1987 | Sturgis ......................... 137/614.04 |

*Primary Examiner*—John C. Fox
*Attorney, Agent, or Firm*—Dickstein Shapiro Morin

[57] ABSTRACT

A fluid conduit coupler having a body means for providing a fluid flow passage between a first fluid flow conduit and a second fluid flow conduit, connection means for connecting the body means to the first and second conduits to establish fluid flow path from the first conduit through the passage to the second conduit and operating means for operating a valve controlling the flow of fluid through the first conduit in response to the connection of the body means to the first and second conduits.

15 Claims, 1 Drawing Sheet

FLUID CONDUIT COUPLER

BACKGROUND OF THE INVENTION

The present invention relates generally to a fluid conduit coupler for connecting together two fluid conduits and more particularly a fluid conduit coupler for connecting conduits having end fittings of incompatible dimensions and for operating a valve positioned in one of the conduits as a result of connection of the two conduits.

In hospital medical gas and vacuum supply systems, a number of gas and vacuum outlets are provided, usually mounted on a wall overhead or mobile equipment. Accessory equipment is connected to the outlets for receiving and using the medical gas and vacuum. Each outlet may have an internal valve that is opened upon the connection of an accessory to the outlet. This valve is typically positioned within the gas or vacuum supply line in and/or behind the outlet mounting structure. Medical gas systems may include a vacuum supply utilized for patient therapy, such as for the suction of body fluids. To protect the surgical staff from exposure of wasted anesthetic gases, an additional vacuum system is typically installed in operating rooms separate from the standard patient therapy vacuum system. This special evacuation system for anesthetic gases is referred to in the industry as "EVAC". To maintain compatibility among gas outlet manufacturers and to prevent gas cross connections, the Compressed Gas Association (CGA) has defined uniform dimensional requirements for gas outlets. These requirements form the Diameter Index Safety System ("DISS") standard. However, in the past, CGA has not considered the EVAC as "vital life support" and has not included EVAC in the uniform dimensional specifications for gas outlets. As a result, each DISS EVAC outlet and accessory manufacturer has adopted its own version of DISS EVAC outlets and accessories. The DISS EVAC outlets and accessories of the various DISS EVAC manufacturers have end fittings that are not compatible with one another. CGA has recently enacted a dimensional standard DISS for EVAC outlets so that all new equipment will be manufactured according to the new standards. Consequently, to meet the new dimensional standards all of the old equipment that was not made according to the new dimensional standards must be replaced at significant expense.

SUMMARY AND OBJECTS OF THE INVENTION

The present invention provides a coupler for adapting the various old style DISS EVAC outlets to the new CGA standard dimensions, for adapting the old style DISS EVAC accessories to the new CGA standard dimensions and for adapting the various old outlets to the various old accessories. This is accomplished by providing a fluid flow coupler having a body means for providing a fluid flow passage between a first fluid flow conduit and a second fluid flow conduit, connection means for connecting the body means to the first and second conduits to establish fluid flow path from the first flow conduit through the passage to the second conduit and operating means for operating a valve controlling the flow of fluid through the first conduit in response to the connection of the body means to the first and second conduits.

It is an object of the present invention to provide a fluid conduit coupler.

It is another object of the present invention to provide a fluid conduit coupler for connecting conduit end fittings having incompatible dimensions.

It is yet another object of the present invention to provide a fluid conduit coupler which operates a valve in one of the conduits upon connection of the two conduits to the coupler.

Other objects and advantages of the present invention will be readily apparent from the following description and drawings.

DETAILED DESCRIPTION OF A PREFERRED EMBODIMENT

Figure 1:
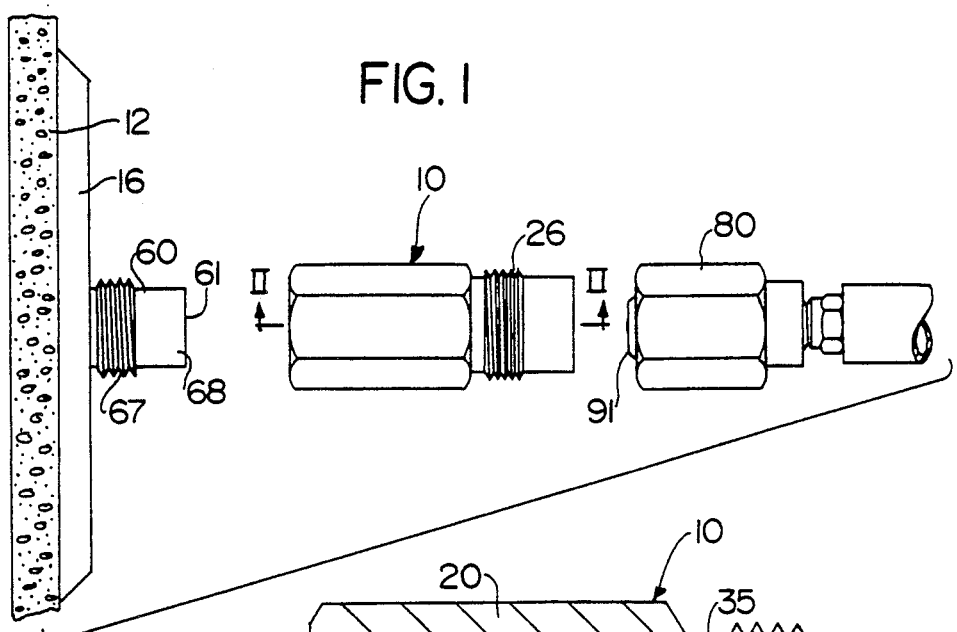
FIG. 1 is an exploded elevation view showing a coupler according to the present invention positioned in an uncoupled positioned between the end fittings of a wall outlet and an accessory.

Refer now to FIG. 1, there being shown a coupler, generally designated by reference numeral 10, in an exploded uncoupled position between a vacuum source outlet end fitting 60 and a vacuum accessory nut assembly end fitting 80. The outlet 60 is mounted on a wall 12 and extends through a mounting cover plate 16 in a known fashion. The vacuum accessory nut assembly 80 does not mate with the outlet 60 in the illustrated preferred embodiment because their respective diameters do not match. Other reasons such a vacuum accessory nut would not mate with the vacuum source outlet may include, for example, internal threads 83 (FIG. 4) of the nut assembly 80 that do not mate with the external threads 67 because of differences in thread pitch, thread depth or positioning of the threads. Moreover, other structural components of a vacuum source outlet and vacuum accessory may not match because each have been designed to different standards. The illustrated preferred embodiment is representative of one such situation, namely where the inner diameter of nut assembly 80 is excessively larger than the outer diameter of the outlet 60.

Figure 2:
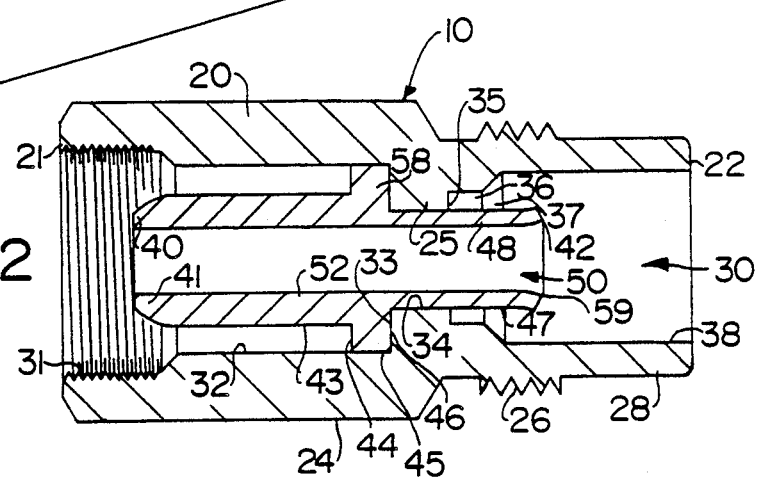
FIG. 2 is a view taken along the section line II—II of FIG. 1.

Refer now to FIG. 2, wherein is shown a cross-sectional view of the coupler 10. The coupler 10 includes a body 20 for coupling together the outlet 60 and the accessory nut assembly 80. The body 20 has a first body end 21 and a second body end 22. Adjacent to the first body end 21, the body 20 includes a first body outer surface 24 that is hex-shaped to form a nut type surface for tightening the body 20 onto the outlet 60 utilizing the threads 31 of the body 20 and the threads 67 of the outlet 60. Adjacent to the second body end 22, the body 20 has a second body outer surface 28, which is cylindrical. External threads 26 extend outwardly over a portion of the surface 28. A body bore 30 extends through the body 20 from the first end 21 to the second end 22. Adjacent to the first end 21 and progressing towards the second end 22, the bore 30 has a threaded first inner cylindrical surface 31, a second inner cylindrical surface 32, a third inner annular surface 33, a fourth inner cylindrical surface 34, a fifth inner annular surface 35, a sixth inner cylindrical surface 36, a seventh inner conical surface 37 and an eighth inner cylindrical surface 38 adjacent to the second end 22.

The coupler 10 includes a plunger 40 positioned within the bore 30. The plunger 40 has a tapered nose end 41 and a flared tail end 42. Adjacent to the nose end 41 and progressing towards the tail end 42, the plunger 40 has a first outer cylindrical surface 43, a second outer annular surface 44, a third outer cylindrical surface 45, a fourth outer annular surface 46 and a fifth outer cylindrical surface 47. A flange 58 extends outwardly from the plunger 40 between the first surface 43 and the fifth surface 47. The flange 58 is annular and includes the second surface 44, the third surface 45 and the fifth surface 46. The plunger 40 has a tail portion 48 that is flared outward at its end 42. The plunger 40 is positioned within the bore 30 to move between a first position and a second position, as described in further detail below. As shown in FIG. 2, the plunger 40 is in the first position. A bore 50 extends through the plunger 40 from the nose end 41 to the tail end 42. The bore 50 has an inner surface 52 which is cylindrical and flares outward at end 42.

The dimensions of the various inner surfaces of the body 20 and the various outer surfaces of the plunger 40 are sized considering the following factors. The threaded first surface 31 is sized to mate with the threads 67 of the outlet 60. The second surface 32 has a diameter sized to extend over the unthreaded surface 68 of the outlet 60. The first surface 43 has a diameter sized to fit within the inner surface 64 (FIG. 3) of the outlet 60. The tapered nose end 41 of the plunger 40 is provided to facilitate alignment and entry of the plunger 40 into the outlet 60 within its inner surface 64. The diameter of the third surface 45 of the flange 58 of the plunger 40 is sized so that it will fit within the second surface 32 of the body 20. The surface 34 has a smaller diameter than the third surface 45 of the flange 58 to prevent the plunger 40 from traveling any farther to the right of FIG. 2 within the bore 30 of the body 20 than the first position as shown in FIG. 2. The outer diameter of the surface 47 of the tail 48 is chosen to fit within the surface 34. A flange 25 is formed by surfaces 33, 34 and 35. The flared end 42 of the plunger 40 is flared outwardly a sufficient distance to be larger in diameter than the surface 34 of the flange 25 to prevent movement of plunger 40 any farther to the left of FIG. 2 once the flared end 42 contacts the end of the surface 34 at the surface 35. In this way, the movement of the plunger 40 is confined between a first position as shown in FIG. 2 and a second position where a flange 59 (defined by the flared end 42 of the plunger 40) contacts the flange 25 at surface 35 of the bore 30. This holds the plunger 40 within the body 20 of the coupler 10 allowing the plunger 40 to move between the first and second position while inhibiting the plunger 40 from falling out or becoming dislodged.

The surface 36 is larger in diameter than the surface 34 to allow room for the flared end 42 to reside inside the surface 36. However, the surface 36 is smaller in diameter than surface 38 to increase the strength of the body 20 near the threads 26. The diameter of the eighth surface 38 is sized to accept the nipple end 91 of the accessory 80 as shown in detail in FIG. 4. The tapered surface 37 is provided to form a sealing surface as explained below.

The diameter of the surface 52 is chosen preferably for minimum resistance of the fluid flow from the first conduit through the bore 50 to the second conduit. Although, in the vacuum application the fluid flow will be in the direction from the second conduit 80 through the passage 50 to the first conduit 60, the coupler would function similarly for flow in the other direction for providing gas to the accessory 80.

Figure 3:
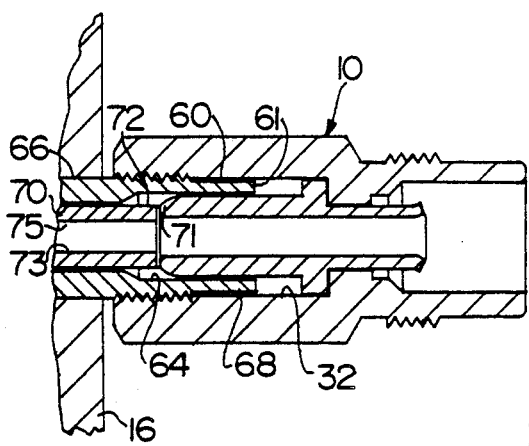
FIG. 3 is a view like FIG. 2 showing the coupler connected to the wall outlet.

Refer now to FIG. 3, wherein the coupler 10 is shown screwed onto the outlet 60. Note that the end 61 of outlet 60 is positioned between the outer surface 43 of the plunger 40 and the inner surface 32 of the body 20. The nose end 41 and outlet valve plunger first end 71 form a seal, as outlined by the CGA DISS requirements. A valve plunger 70 is positioned within the outlet 60. The valve plunger 70 has a first end 71 and a second sealed end 77. When the valve plunger 70 is pushed to the left of FIGS. 3 and 4, the valve opens, thus connecting the vacuum source through the valve plunger passage 75.

Figure 4:
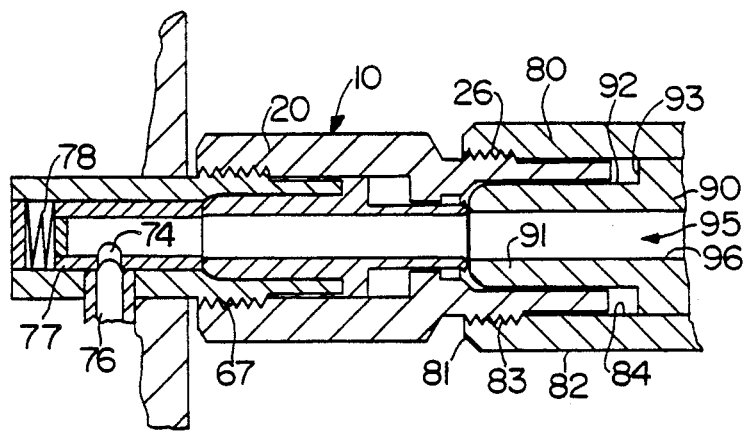
FIG. 4 is a view like FIG. 3, showing the accessory connected to the coupler.

Refer now to FIG. 4, wherein the accessory 80 is shown screwed into position. In this view, the plunger 40 is pushed by the nipple end 91 of the plunger 90 of accessory 80 to move to the left and push the valve plunger 70 to the left compressing spring 78 with end 77 of plunger 70. Thus, the shut-off valve is opened and in the configuration shown in FIG. 4, the vacuum supply 76 is connected through the outlet 74, the passage 75, the passage 50 and the passage 95 to the accessory 80. When accessory 80 is fully screwed into the second end of the body 20, the nipple end 91 and surface 37 of body 20 form a seal that prevents leaks. The valve structure shown in FIG. 4 is representative of one possible structure, however there may be many different valve structures that operate by depressing an internal plunger on the outlet and the coupler 10 would function similarly with such other valve structures that are typically used in the art.

The above description and drawings are only illustrative of a preferred embodiment which achieves the objects, features and advantages of the present invention, and it is not intended that the present invention be limited thereto. Any modifications of the present invention which comes within the spirit and scope of the following claims is considered part of the present invention.

What is claimed as new and desired to be protected by Letters Patent of the United States is:

1. A coupler for connecting a first conduit to a second conduit, the first conduit having a valve to control the flow of fluid through the first conduit, the valve being operated by moving a collet positioned within the first conduit, comprising:
  body means for providing a fluid flow passage between the first conduit and the second conduit;
  connection means for connecting said body to the first conduit and the second conduit to establish a fluid flow path from said first conduit through said passage to said second conduit;
  operating means for moving the collet to open the valve in response to the connection of said body means to the first and second conduits, wherein upon connection said first conduit is positioned between an inside diameter of the body means and an outside diameter of the operating means.

2. A fluid flow conduit coupler comprising:
  body means for providing a coupler fluid flow passage between a first fluid flow conduit and a second fluid flow conduit, said body means including a body bore extending there through, said first fluid flow conduit having a valve means for controlling fluid flow there through;

operating means for operating said valve means in response to connection of said body means to said first and second conduits, said operating means being positioned within said body bore;

first connection means for connecting said body means to said first conduit, wherein said first conduit has a male end and said first connection means has a female end, said male end being positioned between an inside diameter of said first connection means and an outside diameter of said operating means;

second connection means for connecting said body to said second fluid conduit to enable fluid flow from said first conduit through said passage to said second conduit when said body is connected to said first and second conduits.

3. A coupler as in claim 2, wherein said valve means includes activator means for opening said valve means when said activator means is moved, said activator means being positioned within said first conduit, and said operating means includes urging means for moving said activator means in response to urging by said second conduit on said urging means.

4. A coupler as in claim 3, wherein said body means includes a body bore extending there through and said urging means includes a plunger positioned to move within said body bore.

5. A coupler as in claim 4, wherein said coupler fluid flow passage extends through said plunger.

6. A coupler as in claim 5, further comprising limit means for limiting the movement of said plunger between a first position and a second position.

7. A coupler as in claim 6, wherein said body means includes a body limit flange extending inwardly within said body fluid flow passage and said plunger includes a first and a second plunger limit flanges extending outwardly from the plunger, said limit means including said body limit flange and said plunger limit flanges, said flanges being positioned and sized to contact one another to limit the movement of the plunger between said first and second positions.

8. A coupler as in claim 7, wherein said second plunger limit flange is formed by an outwardly extending flare of the wall of plunger at one end of the plunger.

9. A coupler as in claim 8, wherein said plunger has a first body portion and a second body portion, said first body portion having a first end and a first outer surface, said first plunger limit flange extending outwardly from said first outer surface.

10. A coupler as in claim 9, wherein said first conduit is a male end and said first end of said body means is a female end, said male end fitting between the inside diameter of the body means and the outside diameter of the plunger.

11. A coupler as in claim 10, wherein said male end and female ends are cylindrical and threaded.

12. A fluid conduit coupler comprising:

body means for providing a coupler fluid flow passage between a first fluid flow conduit and a second fluid flow conduit;

connection means for connecting said body means to said first conduit and to said second conduit to enable fluid flow from said first conduit through said passage to said second conduit;

valve means for controlling the flow of fluid through said first conduit;

operating means for operating said valve means in response to the connection of said body means to said first and second conduits;

said valve means including activator means for opening said valve means when said activator means is moved, said activator means being positioned within said first conduit, and said operating means including urging means for moving said activator means in response to urging by said second conduit on said urging means;

said body means including a body bore extending therethrough and said urging means including a plunger positioned to move within said body bore;

said coupler fluid flow passage extending through said plunger;

limit means for limiting the movement of said plunger between a first position and second position;

said body means including a body limit flange extending inwardly within said body fluid flow passage and said plunger including a first and a second plunger limit flanges extending outwardly from the plunger, said limit means including said body limit flange and said plunger limit flanges, said flanges being positioned and sized to contact one another to limit the movement of the plunger between said first and second positions; and said second plunger limit flange being formed by an outwardly extending flare of the wall of said plunger at one end of the plunger.

13. A coupler as in claim 12, wherein said plunger has a first body portion and a second body portion, said first body portion having a first end and a first outer surface, said first plunger limit flange extending outwardly from said first outer surface.

14. A coupler as in claim 13, wherein said first conduit is a male end and said first end of said body means is a female end, said male end fitting between the inside diameter of the body means and the outside diameter of the plunger.

15. A coupler as in claim 14, wherein said male end and female end are cylindrical and threaded.

* * * * *